United States Patent
Hildebrandt

(10) Patent No.: US 6,400,512 B1
(45) Date of Patent: Jun. 4, 2002

(54) REFRACTIVE/REFLECTIVE OPTICAL ELEMENT MULTIPLE BEAM SPACER

(75) Inventor: Michael Hildebrandt, Northridge, CA (US)

(73) Assignee: Xerox Corporation, Stamford, CT (US)

(*) Notice: Subject to any disclaimer, the term of this patent is extended or adjusted under 35 U.S.C. 154(b) by 28 days.

(21) Appl. No.: 09/724,659

(22) Filed: Nov. 28, 2000

(51) Int. Cl.[7] .................. G02B 27/12; G02B 27/10; B41J 15/14; B41J 27/00
(52) U.S. Cl. .................. 359/639; 359/618; 347/241
(58) Field of Search ................. 359/618, 619, 359/625, 626, 627, 639, 640, 834, 837; 347/225, 233, 239, 241, 243

(56) References Cited

U.S. PATENT DOCUMENTS

| | | | |
|---|---|---|---|
| 5,155,628 A | * 10/1992 | Dosmann | 359/618 |
| 5,557,475 A | 9/1996 | Nightingale et al. | 359/831 |
| 5,566,024 A | 10/1996 | Rauch | 359/571 |
| 6,301,054 B1 | * 10/2001 | Van Tran | 359/639 |

* cited by examiner

Primary Examiner—Georgia Epps
Assistant Examiner—Alicia M. Harrington
(74) Attorney, Agent, or Firm—William Propp

(57) ABSTRACT

A six sided refractive / reflective optical element controls the separation between four parallel laser beams. Two beams will be reflected off the optical element and two beams will be refracted within the optical element with each reflection and refraction being off a different side of the optical element to form four closely spaced parallel light beams.

2 Claims, 1 Drawing Sheet

REFRACTIVE/REFLECTIVE OPTICAL ELEMENT MULTIPLE BEAM SPACER

CROSS REFERENCE TO RELATED APPLICATIONS

This application contains subject matter that is related to subject matter of patent application Ser. No. 09/428,390, filed on Oct. 28, 1999, now U.S. Pat. No. 6,301,054 entitled "Optical Element for Multiple Beam Separation Control" by Chuong Van Tran, commonly assigned to the same assignee herein and herein incorporated by reference.

BACKGROUND OF THE INVENTION

The present invention relates to a multiple beam spacer and, more particularly, to a refractive / reflective optical element which controls the separation between four parallel laser beams.

Printing systems will use a raster output scanning (ROS) system to have a modulated light beam strike the facets of a rotating polygon mirror and scan in a raster pattern across a photoreceptor. High speed or color printing requires a multiple beam light source.

One possible multiple beam light source is a laser diode array. However, placing two or more laser diodes in a single array creates practical difficulties including phase locking of the emitted laser beams and electrical and thermal interference between the adjacent laser beams.

Another approach to providing a multiple beam light source is to integrate individual laser diodes to form the multiple light beam source. In a ROS system, it is beneficial to have the rotating polygon as thin as possible. Thicker polygons cost more and require larger, higher power and more expensive motors and drivers. A four parallel beam ROS therefore requires that the four beams be closely spaced in order to enable a thin polygon.

The major problem with integrating individual laser diodes into a multiple beam light source is the large spacing between the individual laser diodes caused by the physical size of the laser diodes themselves. The spacing or pitch between two adjacent individual laser diodes can be 100 microns or larger while the required spacing of the two adjacent light beams for printing uses is 25 microns or less, a difference of a factor of four or greater. Also multiple laser beam systems are often required to have beam to beam spacing that is considerably different in different parts of the system.

A beam spacer uses optical elements to expand or contract the pitch or spacing between light beams.

Current technology can use mirrors and lenses as beam spacers. However, manufacturing these optical elements on such a small micron scale requires expensive, extensive fabrication and aligning the various optical elements on an even smaller scale mandates a precision assembly.

Beam combiners, as their name indicates, are optical elements that combine two or more light beams into a single overlapping composite beam. These are distinctly different optical elements from beam spacers which move light beams closer without combining the beams.

Beam splitter prisms can be used as beam spacer elements but this approach reduces the intensity of the output beam by half due to light loss caused by splitting the beam. A tilt plate and a pair of beam steering prisms (or a second tilt plate) are used to split a wide horizontal beam into two smaller vertically aligned beams in U.S. Pat. No. 5,557,475 to improve the brightness symmetry of the beam.

One possible beam spacer is found in U.S. Pat. No. 5,566,024, commonly assigned as the present application and herein incorporated by reference. Two sets of two single blazed binary diffractive optical elements form a beam spacer for contracting two wider spaced parallel beams into two closely spaced parallel beams.

It is an object of the present invention to provide a multiple beam separation spacer of a refractive / reflective optical element which controls the separation between four parallel laser beams.

SUMMARY OF THE INVENTION

According to the present invention, a six sided refractive / reflective optical element will control the separation between four parallel laser beams. A first laser beam will be reflected off a first side of the optical element. A second laser beam will be refracted from a second side to a third side within the optical element. A third laser beams will be refracted from a fourth side to a fifth side within the optical element. A fourth laser beam will be reflected off a sixth side of the optical element. These reflections and refractions by the optical element beam spacer will form four closely spaced parallel light beams.

Other objects and attainments together with a fuller understanding of the invention will become apparent and appreciated by referring to the following description and claims taken in conjunction with the accompanying drawings.

DESCRIPTION OF THE INVENTION

Figure 1:
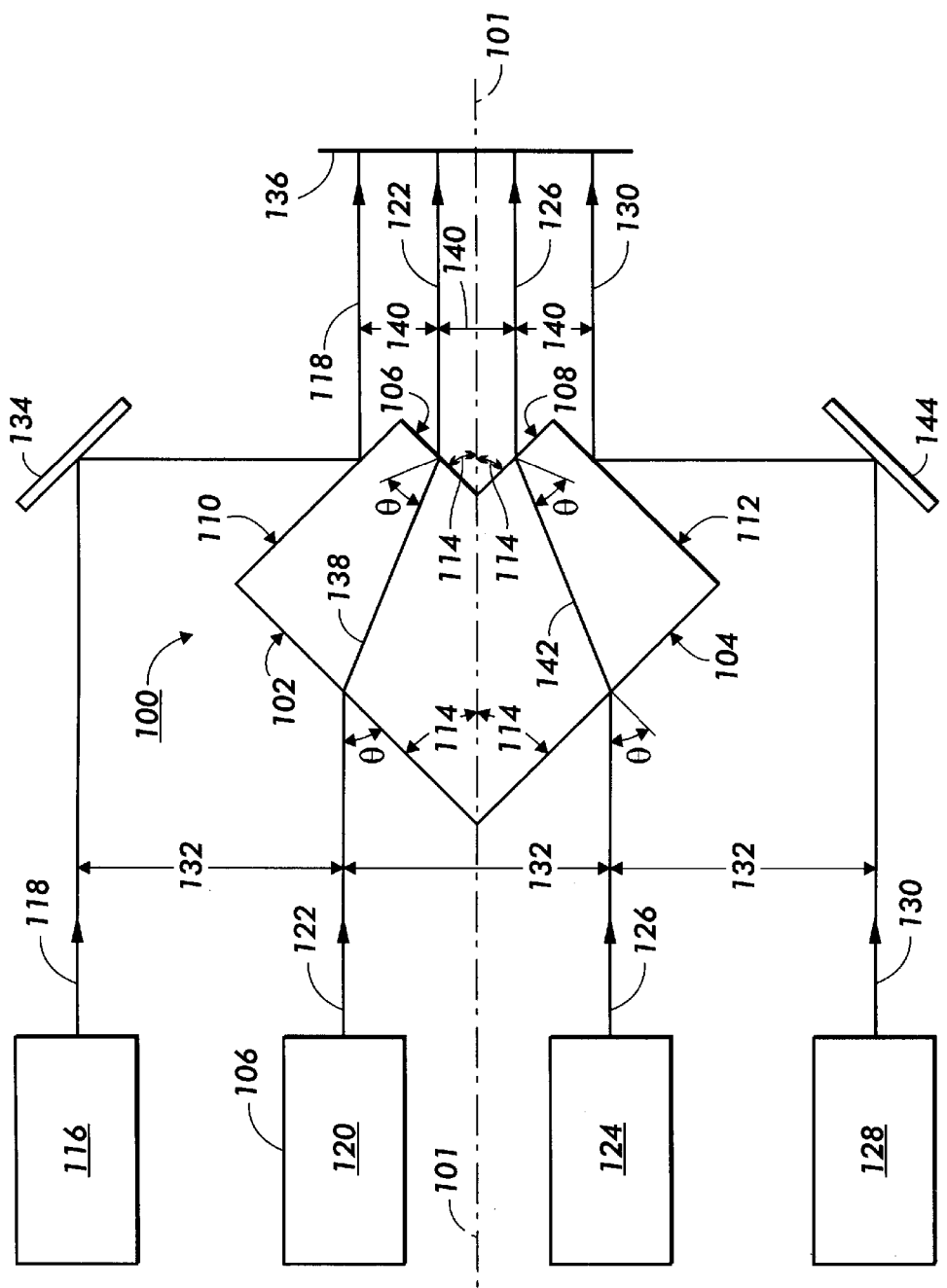
FIG. 1 illustrates a schematic view of the refractive / reflective optical element beam spacer of the present invention.

Reference is now made to FIG. 1 illustrating the single refractive / reflective optical element beam spacer 100 for spacing four laser beams of the present invention.

The refractive / reflective optical element 100 is a single solid element formed of a material that transmits light of the wavelength of the incident light beams and has a uniform index of refraction throughout the material. Examples would include plastics and BK7 glass, as are known in the art.

The optical element 100 has six flat surfaces and has a diamond pattern with a right triangle concave insert on the back corner.

The optical element has a first incident surface 102 adjacent to a second incident surface 104. The optical element has a first output surface 106 adjacent to a second output surface 108. The optical element has a fifth reflective surface 110 which is adjacent to the first incident surface 102 and the first output surface 106. The optical element has a sixth reflective surface 112 which is adjacent to the second incident surface 104 and the second output surface 108.

The first incident surface 102 is at a specified angle 114 relative to the optical axis 101. The first output surface 106 is at the same specified angle 114 relative to the optical axis 101. The first incident surface 102 is parallel to the first output surface 106.

The second incident surface 104 is at the same specified angle 114 relative to the optical axis 101. The second output surface 108 is at the same specified angle 114 relative to the optical axis 101. The second incident surface 104 is parallel to the second output surface 108.

A first laser diode 116 will emit a first laser beam 118. A second laser diode 120 will emit a second laser beam 122.

A third laser diode 124 will emit a third laser beam 126. A fourth laser diode 128 will emit a fourth laser beam 130. The laser diodes 116, 120, 124 and 128 may be in array or be individual diodes separate from the other diodes.

The wavelengths of the four laser beams 118, 122, 126 and 130 are the same. The four laser beams 118, 122, 126 and 130 are parallel and adjacent beams are separated by a first spacing distance 132.

The second and third light beams 122 and 126 are symmetric around the optical axis 101 and equally spaced from the optical axis 101 in the direction of light propagation. The first and fourth light beams 118 and 130 are symmetric around the optical axis 101 and equally spaced from the optical axis 101 in the direction of light propagation. The refractive / reflective optical element 100 is symmetric around the optical axis 101 in the direction of light propagation.

The first laser beam 118, after emission by the first laser diode 116, win be reflected by the first turn mirror 134. The reflected first laser beam 118 will be incident on the fifth reflective surface 110 of the beam spacer 100 and reflected parallel to the optical axis 101 to the scan line 136. The scan line 136 is perpendicular to the optical axis 101.

The second light beam 122, after emission by the second laser diode 120, will be incident upon the first input surface 102 of the beam spacer 100 at an angle θ. The second laser beam 122 will refract at the input surface 102 and travel through the length 138 of the beam spacer 100.

The second laser beam 122 will then refract at the first output surface 106 of the beam spacer 100 at an angle θ. The angle of incidence θ and the exit angle θ are the same. The first input surface 102 of the beam spacer 100 is parallel to the first output surface 106.

The second laser beam 122 will be refracted parallel to the optical axis 101 to the scan line 136.

The second laser beam 122 and the adjacent first laser beam 118 are separated by a second spacing distance 140 at the scan line 136. The second spacing distance 140 after refraction and reflection of the beams by the beam spacer 100 is less than the first spacing distance 132 before the beam spacer. As seen in this Figure the second laser beam 122 has been displaced laterally by the beam spacer 100 to be closer in spacing or pitch to the adjacent beam 118. The amount of lateral displacement is proportional to the length 138 of the beam spacer.

The third laser beam 126, after emission by the third laser diode 124, will be incident upon the second input surface 104 of the beam spacer 100 at an angle θ, the same angle of incidence as the first laser beam 118. The third laser beam 126 will refract at the second input surface 104 and travel through the length 142 of the beam spacer 120. The length 142 of the third laser beam 126 through the beam spacer 100 is the same as the length 138 of the first laser beam 118 through the beam spacer 100.

The third laser beam 126 will then refract at the second output surface 108 of the beam spacer 100 at an angle θ, the same exit angle as the first beam. The angle of incidence θ and the exit angle θ for the third laser beam are the same. The second input surface 108 of the beam spacer is parallel to the second output surface 104.

The third laser beam 128 will be refracted parallel to the optical axis 101 to the scan line 136.

The third laser beam 126 and the adjacent second laser beam 122 are separated by the second spacing distance 140 at the scan line 136. This second spacing distance 140 is the same spacing distance between the second laser beam 122 and the first laser beam 118.

The second spacing distance 140 after refraction by the beam spacer 100 is less than the first spacing distance 132 before the beam spacer. As seen in this Figure the third laser beam 126 has been displaced laterally by the beam spacer 100 to be closer in spacing or pitch to the adjacent beam 122. The amount of lateral displacement is proportional to the length 142 of the beam spacer.

The fourth laser beam 130, after emission by the fourth laser diode 128, will be reflected by the second turn mirror 144. The reflected fourth laser beam 130 will be incident on the sixth reflective surface 112 of the beam spacer 100 and reflected parallel to the optical axis 101 to the scan line 136.

The fourth laser beam 130 and the adjacent third laser beam 126 are separated by the second spacing distance 140 at the scan line 136. This second spacing distance 140 is the same spacing distance between the third laser beam 126 and the second laser beam 122 and between the second laser beam 122 and the first laser beam 118.

The second spacing distance 140 after refraction by the beam spacer 100 is less than the first spacing distance 132 before the beam spacer. As seen in this Figure, the fourth laser beam 130 has been displaced laterally by the beam spacer 100 to be closer in spacing or pitch to the adjacent beam 126.

The optical element 100 of FIG. 1 has six flat surfaces and has a diamond pattern with a right triangle concave insert on the back corner. The optical element could alternately have a flat front surface between the first and second incident surfaces or a flat back surface between the first and second output surfaces.

The input and output surfaces of the beam spacer typically have an antireflection coating to increase refraction of the laser beam.

The beam spacer of the present invention will also closely space three or two beams with the present design.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A beam spacer for closely spacing four parallel light beams comprising:
   a first laser source for emitting a first light beam,
   a second laser source for emitting a second light beam, said second light beam and said first light beam being separated by a first spacing,
   a third laser source for emitting a third light beam, said third light beam and second light beam being separated by said first spacing,
   a fourth laser source for emitting a fourth light beam, said fourth light beam and said third light beam being separated by said first spacing; said first light beam, said second light beam, said third light beam and said fourth light beam being parallel, and
   an optical element having:
      a first incident surface for refracting said second light beam to a first exit surface which refracts said second light beam from said optical element to a scan line, said first incident surface being parallel to said first exit surface, said first incident surface and said first exit surface being at an angle to an optical axis, a second incident surface for refracting said third light beam to a second exit surface which refracts said third light beam from said optical element to said scan line, said second incident surface being parallel to said second exit surface, said second incident surface and said second exit surface being at said same angle as said first incident surface and said first exit surface to said optical axis, a first reflective surface for reflecting said first light beam from a first turn mirror to said scan line, and a second reflective surface for reflecting said fourth light beam from a second turn mirror to said scan line, whereby said reflected first light beam and said refracted second light beam are separated by a second spacing at said scan line, said refracted second light beam and said refracted third light beam are separated by said second spacing at said scan line, said refracted third light beam and said reflected fourth light beam are separated by said second spacing at said scan line, wherein said reflected first light beam, said refracted second light beam, said refracted third light beam and said reflected fourth light beam are parallel and said second spacing is less than said first spacing.

2. The beam spacer for closely spacing four parallel light beams of claim 1 wherein with said first incident surface, said second incident surface, said first reflective surface and said second reflective surface form a diamond shape for said optical element with said first exit surface and said second exit surface form a right triangle concave insert between said first reflective surface and said second reflective surface on said diamond shape for said optical element.

* * * * *